Feb. 17, 1959

C. A. YOUNG ET AL 2,873,770

BATTERY PASTING MACHINE

Filed March 30, 1955

INVENTORS
CHARLES A. YOUNG
FRED R. KERNS
BY
ATTORNEYS

INVENTORS
CHARLES A. YOUNG
FRED R. KERNS
ATTORNEYS

United States Patent Office 2,873,770
Patented Feb. 17, 1959

2,873,770

BATTERY PASTING MACHINE

Charles A. Young and Fred R. Kerns, Cleveland Heights, Ohio, assignors to The Electric Storage Battery Company, Philadelphia, Pa., a corporation of New Jersey Application March 30, 1955, Serial No. 498,075

6 Claims. (Cl. 141—32)

The present invention relates to machines for applying paste material to articles and, more particularly, to machines for "pasting" electric battery grids.

An object of the present invention is the provision of a new and improved relatively high speed machine for applying paste material to battery grids or the like in a manner assuring that all portions of the grids will be properly filled with the paste material.

Another object of the invention is the provision of a new and improved battery grid pasting machine of the character referred to which is simple in construction, efficient in operation, and relatively inexpensive to manufacture.

A further object of the invention is the provision of a new and improved battery grid pasting machine of the character referred to and which comprises paste feed means having a paste hopper and a discharge opening in a surface generally complementary to the grids to be pasted, in combination with a grid carrier member having a surface in sliding engagement with the paste feed means and provided with a plurality of grid-receiving recesses each having a depth adapted to position a grid in predetermined relation to the surface of the carrier, means for producing relative movement between the paste feed means and the carrier member to cause the grid-receiving recesses to pass underneath the discharge opening of the paste feed means, and means for forcing paste material in the hopper through the discharge opening into or onto grids in the grid-receiving recesses of the carrier as they are moved past the paste feed means.

The invention resides in certain constructions and combinations and arrangements of parts, and further objects and advantages thereof will be apparent to those skilled in the art to which it relates from the following description of the preferred embodiment described with reference to the accompanying drawings forming a part of this specification, in which similar reference characters designate corresponding parts, and in which.

Figures 1, 6:
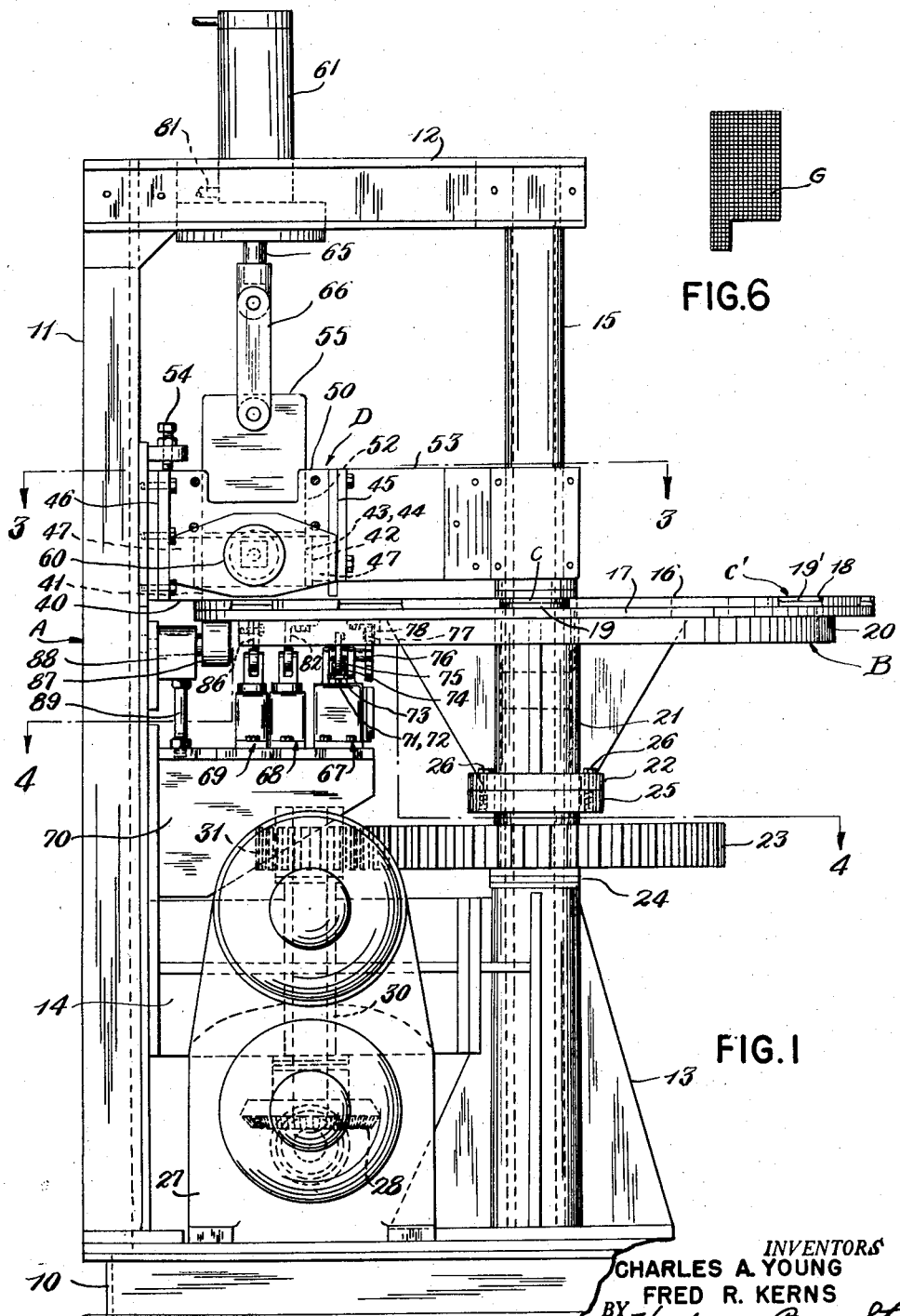
Fig. 1 is a side elevational view of a machine embodying the principles of the present invention.
Fig. 6 is a side view of a grid adapted to be pasted by the machine shown.

Although it is to be understood that the invention may be otherwise embodied, it is herein illustrated and described as embodied in a machine especially designed to paste flat, generally rectangularly-shaped, foraminous battery grids G.

The machine shown in the drawing comprises a frame, generally indicated as A, having a channel iron base 10 to which is bolted an upright member 11 carrying a horizontally extending head bracket 12 at its upper end. The frame also includes a pedestal 13 bolted to the base 10 and tied to the upright member 11 by a horizontal brace or bearing bracket 14 and a stationary, vertical center shaft or tubular member 15 rigidly and non-rotatably connected between the pedestal 13 and the horizontal head bracket 12.

A disk-shaped turntable or carrier member B having a series of grid-receiving recesses C, C' spaced around the periphery of the top surface thereof is rotatably mounted about the vertical center shaft 15 for carrying grids to be pasted and located in the recesses, past paste feed means D positioned adjacent to the top surface of the carrier member. The paste feed means D is adapted to fill the recesses C, C' with paste substantially level with the top surface of the carrier member and thereby apply paste to the grids therein as the recesses pass thereby.

It is desired in the present instance to completely embed the foraminous grids in paste and to provide smooth and uniform paste surfaces on both sides of the grids. In the present machine, this is accomplished, by placing unpasted grids in the recesses C which have a depth slightly greater than the thickness of the unpasted grids, and thereafter filling the recesses with paste by passing them underneath the paste feed means. This applies paste to the grids in the recesses and forms layers of desired thickness on their upper sides. The grids which have been partially pasted in the manner just mentioned are subsequently placed pasted side down in the recesses C' which are of such a depth to complete the grid pasting operation when the recesses C' in which they are positioned are filled with paste as they pass underneath the paste feed means D.

The carrier member B is conveniently provided with the recess C, C' of different depths by forming the carrier from two disk-shaped plates 16 and 17 positioned one on top of the other. The upper plate 16 has a thickness greater than the depth of the recesses C' and has a plurality of sections removed around its outer edge to form apertures 18 therethrough which conform generally in shape to the battery grids. Pads 19, 19' of predetermined thickness are placed in the bottom of alternate apertures 18 and fixed to the bottom plate 17 by countersunk head screws 29. The pads 19' are of a thickness such that the remaining openings in the apertures thereabove form the recesses C' of the desired depth, and the pads 19 of slightly greater thickness than the pads 19' and the space thereabove form the recesses C of the desired shallower depth. The machine shown is provided with a total of twelve alternately spaced recesses C', C of different desired depths around the periphery of the carrier. The recesses C, C' are arranged in a series beginning with a deeper recess C' and ending with a shallower recess C. The recesses C, C' of the series are equally spaced with reference to one another, with a wider space between the first and last recesses of the series than that provided between the other recesses. Alternatively, the number and arrangement of recesses may be varied as desired.

The plate 16 is suitably bolted to the top side of plate 17 and a circular stiffening ring 20 is welded to the bottom side of plate 17 beneath the grid-receiving recesses. The plates are journaled about the center shaft 15 by a cylindrical bearing structure 21 depending from the bottom of plate 17, which bearing structure has a circular flange 22 on its lower end.

The turntable or carrier member B just described is supported or spaced above the pedestal 13 by a bull gear 23 suitably journaled about the center shaft 15 and resting upon a brass bearing washer 24 positioned on top of the pedestal 13. The upper end of the bull gear 23 is provided with a companion flange 25 adapted to support the circular flange 22 on the bottom of the turntable and a shearable driving connection therebetween is provided by a pair of pins 26 such that damage to the machine may be avoided should the turntable become jammed. The bull gear 23 is, in turn, driven by an electrically powered gear reduction unit 27 bolted to the base through bevel gears 28 which drive the lower end of a vertically extending jack shaft 30 suitably journaled upon the bearing bracket 14 and whose upper end carries a spur gear 31 in mesh with the bull gear 23.

As previously stated, grids positioned in the grid-receiving recesses C, C' are moved by the carrier member B past the paste feed means D which fills the recesses with paste as they pass thereby and, in turn, applies paste to the grids therein. The paste feed means D, as shown, comprises a rectangularly-shaped bottom plate 40 having a centrally located slit or nozzle 41 therethrough of a rectangular cross section whose length extends crosswise of the plate 40. The plate 40, when viewed in plan, is positioned adjacent the top surface of the carrier B with the nozzle 41 extending crosswise of the path of the grid-receiving recesses C, C' and the length of the bottom plate 40 extending generally tangent thereto. A rectangularly-shaped, block-like slide, hopper member or magazine 42 is positioned on top of the bottom plate 40 for sliding engagement therewith lengthwise of each other. The member 42 has a pair of vertically extending apertures or paste receiving chambers or compartments 43 and 44 of rectangular cross section, whose length extends crosswise of the slide, one adjacent to either end of the member 42 and adapted to be moved selectively into alignment with the rectangularly-shaped nozzle 41 in the bottom plate. The hopper member or hopper 42 is restrained from lateral movement by inner and outer side plates 45 and 46, each having an inwardly extending projection 47 adapted to abut the adjacent side of the member, and is held down upon the bottom plate 40 by the lower edges of a pair of vertically positioned plates 50 and 51 extending transversely between the side plates and bolted to the sides of the above-mentioned projections 47. The top portion of each of the previously mentioned projections 47 extends slightly inwardly over the top of the member 42 and together with the plates 50 and 51 form a ram-receiving aperture 52 positioned directly above the nozzle 41 in the bottom plate 40 and corresponding in shape thereto. The inner side plate 45 is attached to the center shaft 15 by a frame arm 53 adjustably clamped to the stationary center shaft 15 and the outer side plate 46 is adjustably bolted to the upright member 11 of the frame. A jam screw 54 carried by the upright member 11 and adapted to abut the upper edge of the side plate 46 is provided for forcing the feed mechanism D into engagement with the plate 16 of the carrier before the feed means is bolted in place.

The member 42 is adapted for selective movement between the position shown in Figs. 2 and 3, hereinafter referred to as the rear position, wherein the aperture 43, hereinafter referred to as the first aperture, is in alignment with the discharge nozzle 41 and the ram-receiving aperture 52 and wherein the aperture 44, hereinafter referred to as the rear aperture, is positioned rearwardly of the guide plate 50 where it can be filled with paste; and a forward position wherein the rear aperture 44 is aligned with the discharge opening or nozzle 41 and the ram receiving aperture 52 and wherein the front aperture 43 is moved forwardly of the guide plate 51 where it can be filled with paste. The paste material in the chambers 43, 44 aligned with the discharge opening or nozzle 41 in the bottom plate 40, at any particular time is adapted to be forced therefrom through the nozzle 41 and into the grid-receiving recesses C, C' passing thereby by a rectangularly-shaped ram 55 slidably supported in the upper end of the ram-receiving aperture 52 and adapted to be moved from a position above the member 42, which position permits shifting of the hopper from one to the other of its forward and rear positions without interference from the ram into the paste-receiving aperture.

The member 42 and the ram 55 of the paste feed means D may be actuated by any suitable means. As shown, they are reciprocated by double acting fluid pressure motors 60 and 61, respectively. The fluid pressure motor 60 for actuating the member 42 is mounted horizontally on a bracket 62 extending between and welded to the rear ends of the side plates 45, 46 with its piston rod 63 in alignment with and connected to the member 42 by means of a bracket 64 bolted to the rear side of the member 42 and pivotally connected to the piston rod 63. The fluid pressure motor 61 for actuating the ram 55 is mounted in a vertical position on the head bracket 12 of the frame, with its piston rod 65 in alignment with and connected to the ram 55 by a link 66 pivotally connected at its ends to the ram 55 and the piston rod 65, respectively.

The paste-receiving apertures 43 and 44 of the hopper 42 are preferably sized to contain enough paste for filling more than one grid and, as shown, are sized to carry enough paste to fill all of the grids which pass the paste feed means during one revolution of the carrier. It is necessary, therefore, to shift the hopper 42 and bring a fresh supply of paste into alignment with the ram each time the carrier makes one revolution. In the machine shown, the member 42 is shifted between the time the last recess C in the series shown has moved past the paste feed means and before the first recess C' in the series reaches the paste feed means. While the series of recesses C, C' could have been equally spaced about the periphery of the carrier with the first and last recesses of the series adjacent each other and spaced apart a distance corresponding to the spacing between other recesses of the series and the hopper shifted quickly during the normal period of time required for the portion of the carrier between any two recesses to pass the paste nozzle 41 of the feed means D, a greater spacing or gap has been provided in the present machine between the first and last recess of the series to permit a longer period of time within which to move the hopper 42. During the passage of the gap between the last and first recesses of the series past the paste feed nozzle 41, the ram 55 is first raised to its upper position above the hopper 42 and the slide shifted to align the other aperture therein with the ram 52 and thus bring a fresh supply of paste into alignment with the ram, whereupon pressure is again automatically applied to the ram as the recesses C, C' pass underneath the paste nozzle 41.

Automatic means is provided in the present machine for controlling the operation of the motors 60, 61 to move the member 42 and the ram 55 in timed relation to the rotation of the carrier, in the form of suitable valves 67, 68, 69 for controlling the application of pressure fluid from a fluid pressure source, not shown, to the fluid pressure motors in the appropriate manner and at the appropriate times. The valves 67, 68, 69 which are connected to a source of fluid pressure by conduit means, not shown, are supported on a bracket 70 bolted to the face of the upright member 11 of the frame and projecting underneath the carrier inwardly toward the center shaft 15. The most inwardly positioned valve 67 comprises two vertical, plunger-type valve mechanisms 71 and 72, one of which is connected by a conduit, not shown, to one end of the double-acting, fluid pressure motor 60 which operates the member 42, and the other plunger valve mechanism is connected by a conduit, not shown, to the other end of the fluid pressure motor 60. A rocker arm 73 positioned over the plungers is suitably pivoted about a transverse axis midway between the plungers such that when the rocker arm 73 is tilted in one position the plunger of one of the mechanisms is depressed to cause fluid pressure to be applied to one side of the fluid pressure motor 60 and the member 42 to be held or moved, as the case may be, into one position and, when the rocker arm is tilted into its other position, the other valve mechanism is depressed to cause fluid pressure to be applied to the other side of the fluid pressure motor 60 and the member 42 to be held or moved, as the case may be, into its other position. The rocker arm 73 is tilted from one of the positions to the other of the positions once during each revolution of the carrier by means of a disk-shaped operating wheel 74 fixed to one end of a longitudinal shaft journaled directly above the axis of the rocker arm and having horizontally projecting pins 75 on its side surfaces. One end of the rocker arm 73 is provided with a cam surface extending upwardly adjacent one side of the operating wheel to engage the pins on its side of the wheel as they move thereby and tip its end of the rocker arm downwardly; and the other end of the rocker arm 73 is provided with a cam surface extending upwardly adjacent the other side of the operating wheel 74 to engage the pins projecting from its side of the wheel as they move thereby and force its end of the rocker arm downwardly. Any number of pins may be provided and, as shown, the operating wheel 74 is provided with a total of six pins, three projecting from each side of the wheel and alternate pins projecting from opposite sides of the wheel. The wheel 74 is rotated through an angle corresponding to the angle between succeeding pins which, in the present instance, is 60° by a toothed wheel 76 keyed to the same shaft which carries the operating wheel 74 and having six teeth uniformly spaced around its periphery. The toothed wheel 76 is rotated 60° and the rocker arm 73 tilted to its other position during each revolution of the carrier by means of a roller 77 attached to an angle iron bracket welded to the under surface of the carrier in position to engage and rotate the operating wheel 74 60°.

The middle valve 68 is connected by a conduit, not shown, to the lower end 81 of the fluid pressure motor 61. The valve 68 is adapted to be momentarily actuated once during each revolution of the carrier by a trip 82 attached to the under surface of the carrier to admit fluid pressure to the lower end of the motor 61 and to raise the ram 55 preparatory to the slide 42 being shifted by the motor 60 and hold the same in raised position while the member 42 is being shifted. The valve trips or actuators 77, 82 are so positioned that the motors 60, 61 are operated in the desired sequence immediately after the last of the recesses in the series of grid receiving recesses in the carrier has passed the paste feed means or the nozzle thereof and before the first recess in the series is again moved beneath the paste feed means or nozzle thereof.

The outwardly positioned valve 69 is connected to the top of the fluid pressure motor 61 by a conduit, not shown, and controls the flow of pressure fluid to and from the motor to apply pressure to the ram 55. This pressure is applied preferably only during the period of time that grids are passing under the paste feed means. Accordingly a series of cams or trips 86 are provided on the under surface of the carrier, one for each grid-receiving recess, to actuate the valve 69 to apply fluid pressure to the motor 61 only during the period of time that the grid-receiving recess corresponding therewith is passing beneath the paste discharge nozzle of the paste feed means. To assist in preventing the upper surface of the carrier from being sprung away from engagement with the under surface of the paste feed means by the pressure of the paste, etc., the periphery of the turntable B is supported adjacent the paste feed means D by a roller 87 in engagement with the under surface of the carrier. The roller is carried by a member 88 adapted to be bolted to the upright 11 and which is adjustably supported above the valve bracket 70 by means of a positioning screw 89.

Figure 2:
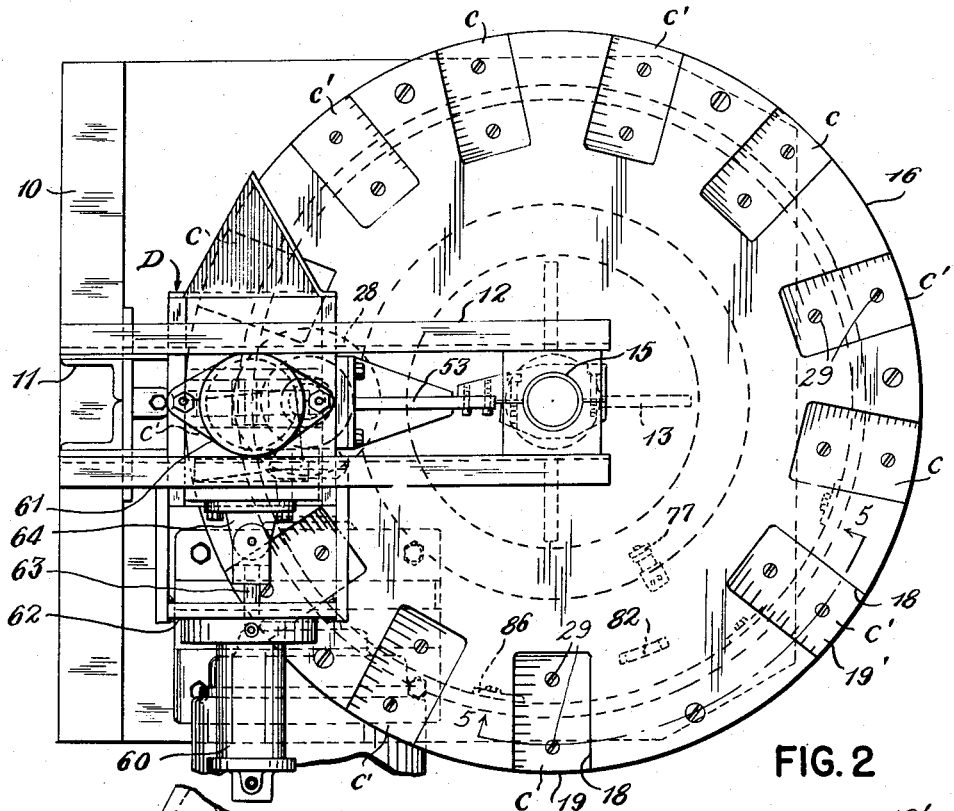
Fig. 2 is a plan view of the machine shown in Fig. 1.
Figures 3, 4, 5:
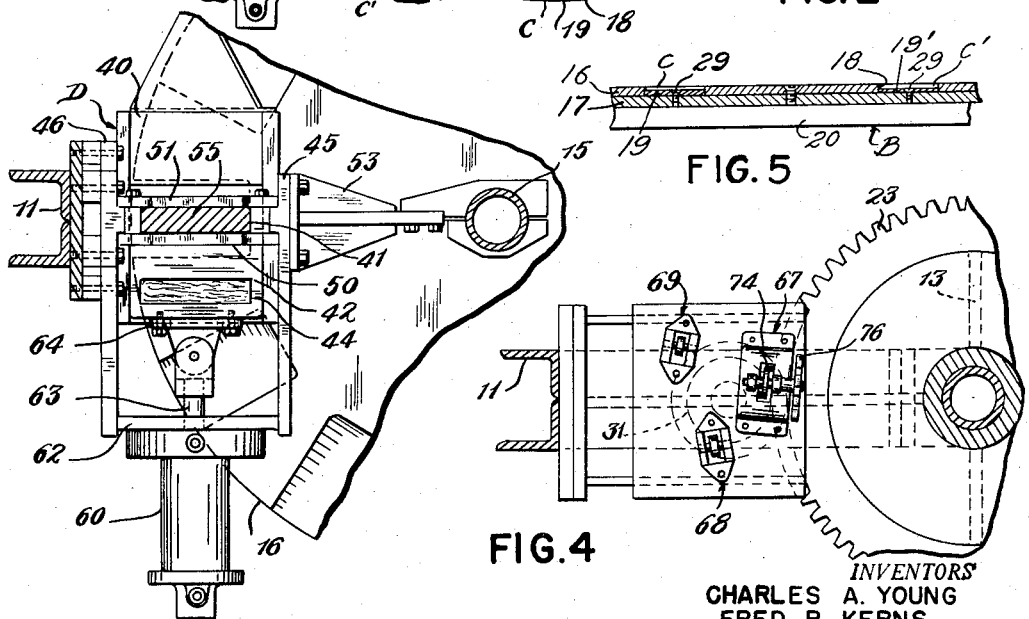
Fig. 3 is a fragmentary sectional view taken approximately on the line 3—3 of Fig. 1.
Fig. 4 is a fragmentary sectional view taken approximately on the line 4—4 of Fig. 1.
Fig. 5 is a fragmentary sectional view taken approximately on the line 5—5 of Fig. 1.

The machine of the drawings is designed to be loaded and unloaded by an operator stationed adjacent to the right-hand side of the machine as viewed in Figs. 1 and 2 of the drawings. Prior to starting the machine the operator places blanks or previously pasted grids into the grid-receiving recesses C' to prevent the recesses themselves from becoming filled with paste during the first revolution of the carrier. The operator also first places a piece of paper and then an unpasted grid in each of the grid-receiving recesses C intermediate his position and the paste feed means. The purpose of the papers is to prevent the paste material from sticking to the bottom of the recesses and, alternatively, a dusting powder, a spray or some other lubricant may be used to accomplish this purpose. The machine is then started and as the grid-receiving recesses C pass his position, he loads each recess with a piece of paper and a grid. As the recess C' ahead of the first recess C to approach the feeding means reaches the loading and unloading station, the operator removes the blank therein, places a piece of paper in the recess, transfers the partly pasted grid from the immediately trailing recess C thereon, first removing the paper on its lower side if it adheres thereto and turning the grid over, and places a new paper and grid in the recess C just unloaded. The operation just described is repeated as successive recesses C', C are moved past the loading and unloading station. As the grids in the shallower recesses C pass the paste feed means, they are partly pasted and one side finish coated and as they again pass the paste feed means after having been turned over and positioned in a deeper recess C', the pasting is completed and the other side properly coated. As the grids are moved by the carrier past the paste feed means, paste is forced into and on the grids by the ram while they are underneath the nozzle.

The paste which is forced into the grid-receiving recesses C, C' under pressure by the ram is prevented from exuding up out of the recesses by the bottom plate 40 of the feed means which surrounds the discharge nozzle 41 and which extends forwardly and rearwardly of the paste discharge nozzle 41 a distance slightly greater than the width of the recesses C, C' to cover each recess while any part thereof is under the paste discharge nozzle. This holds paste leakage out of the recesses to a minimum and insures that a smooth and uniform paste surface will be provided to the top surface of the grids. Continuous rotation of the carrier brings the grids back to the operator at the loading and unloading station, who removes the fully pasted grids from the recesses C', places a new sheet of paper therein, and transfers the partly pasted grids in the immediately following recesses C with the pasted sides of the grids facing downwardly.

During the period of time that the previously referred to gap between the first and last recesses of the series passes the paste feed means, the ram is automatically moved out of the magazine by valve 68 and fluid pressure motor 61, and the magazine 42 shifted by the valve 67 and fluid pressure motor 60 to bring a fresh supply of paste beneath the ram. During the next revolution of the carrier, an operator stationed at the paste feed means D fills the paste-receiving aperture of the slide which was emptied during the previous revolution of the carrier.

It will be apparent from the foregoing that the preferred embodiment shown and described has been specifically adapted to apply paste material to both sides of a foraminous battery grid in a manner assuring that the grids will be completely embedded in the paste and that a smooth and uniform paste surface is provided on both sides of the grids. It is to be understood, however, that the present invention is not limited to the particular machine shown or to the forming of a paste surface lying in a single plane, but that the invention may be otherwise embodied and is equally applicable to the forming of any type of paste surface so long as the surface can be generated by moving a cross section of the desired pasted grid in a predetermined path.

From the foregoing description of the invention it will be apparent that the objects heretofore enumerated as well as others have been accomplished, and that there has been provided a new and improved machine for pasting battery grids and the like which can be used to apply paste material to the grids in a manner providing a predetermined paste surface.

While the preferred embodiment of the invention has been described in considerable detail, we do not wish to be limited to the particular construction shown which may be varied within the scope of the invention and it is the intention to cover hereby all adaptations, modifications and arrangements thereof which come within the practice of those skilled in the art to which the invention relates.

Having thus described our invention, we claim:

1. A machine for applying a paste material to a battery grid or the like comprising, a frame, a grid carrier member movably supported by said frame and having a plurality of grid receiving recesses therein, said recesses being shaped to receive the grids in a position with the side surface of the grid to which paste is to be applied facing outwardly of the carrier member and having a depth at least as great as the thickness of the grids, means for moving said carrier member whereby grids carried thereby are moved in a predetermined path, paste feed mechanism slidingly engaging said carrier member and overlying said path of the grids for feeding paste thereto, said paste feed mechanism having a paste receiving chamber in communication at one end with the surface which slidingly engages said carrier member, a ram mounted for reciprocation in the other end of said chamber, a slide in said paste feed mechanism positioned transversely of said paste receiving chamber and having a ram receiving opening therethrough forming a part of said paste receiving chamber, said slide being adapted for transverse movement relative to said ram to bring its ram receiving opening externally of the paste feed mechanism when the ram is withdrawn from said opening.

2. A machine for applying a paste material to a battery grid or the like comprising, a frame, a grid carrier member movably supported by said frame and having a plurality of grid receiving recesses therein, said recesses being shaped to receive the grids in a position with the side surface of the grid to which paste is to be applied facing outwardly of the carrier and having a depth at least as great as the thickness of the grids, means for moving said carrier member whereby grids carried thereby are moved in an arcuate path, paste feed mechanism slidingly engaging said carrier member and overlying said path of the grids for feeding paste thereto, said paste feed mechanism having a paste receiving chamber in communication at one end with the surface which slidingly engages said carrier member, a ram mounted for reciprocation in the other end of said chamber, a slide in said paste feed mechanism positioned transversely of said paste receiving chamber and having a plurality of ram receiving openings therethrough any one of which when properly aligned forms a part of said paste receiving chamber, said slide being adapted for transverse movement relative to said ram to alternately move said ram receiving openings between a position externally of said paste feed mechanism and a position in alignment with said ram.

3. A machine for applying a paste material to a battery grid or the like comprising, a frame, a disk-shaped grid carrier rotatably supported by said frame and having a plurality of grid receiving recesses in one end face of the carrier disposed symmetrically about its axis of rotation, said recesses being shaped to receive the grids in a position with the side surface of the carrier to which paste is to be applied facing outwardly of the carrier and having a depth at least as great as the thickness of the grids, means for rotating said carrier whereby grids carried thereby are moved in an arcuate path, paste feed mechanism slidingly engaging said end face of the carrier and overlying said path of the grids for feeding paste thereto, said paste feed mechanism having a paste receiving chamber in communication at one end with the surface which slidingly engages said end face of the carrier, a ram mounted for reciprocation in the other end of said chamber, a slide in said paste feed mechanism positioned transversely of said paste receiving chamber and having a plurality of ram receiving openings therethrough any one of which when properly aligned forms a part of said paste receiving chamber, said slide being adapted for transverse movement relative to said ram to alternately move said ram receiving openings between a position externally of said paste feed mechanism and a position in alignment with said ram, means forcing said ram into a ram receiving opening in alignment with said ram, means interrupting the force applied by said last-mentioned means as the surfaces of said carrier between said grid receiving recesses are moved past said paste feed mechanism, and means withdrawing said ram from said ram receiving opening and thereafter moving said slide to bring another of its ram receiving openings into alignment with said ram in timed relation to the rotation of said carrier.

4. In a machine for applying paste material to battery grids, a grid carrier member having a surface provided with a plurality of spaced grid receiving recesses of a predetermined greater depth than the thickness of the grids to be pasted whereby the outer surface of the grids positioned in said recesses are predetermined distances below said surface of said carrier member, paste feeding means provided with a surface conforming in contour to said surface of said grid carrier member and having in said surface an opening through which paste may be discharged or fed, means supporting said grid carrier member and said paste feeding means with said surfaces adjacent to one another for relative movement with respect to each other, means for producing relative movement between said grid carrier member and said paste feeding means to cause said grid recesses and said opening to move relatively past one another, said surface of said paste feeding means extending from said opening sufficiently to overlie respective recesses in said grid carrier member during the intervals that said opening in said feeding means is in communication with any portion of said recesses whereby paste is prevented from overflowing said recesses during said intervals, and means for forcing paste through said opening in said feeding means and into said grid receiving recesses of said carrier member during the intervals that said recesses are in communication with said opening in said feeding means.

5. In a machine for applying paste material to plate-like battery grids, a frame, a disk-like grid carrier member having a top surface provided with a plurality of spaced grid receiving recesses of a predetermined greater depth than the thickness of the grids to be pasted whereby the outer surface of grids positioned in said recesses are predetermined distances below said surface of said carrier member, means for rotatably supporting said carrier member in said frame, paste feeding means above said carrier member provided with a bottom surface conforming in contour to said top surface of said carrier member and having in said surface an opening adapted to have paste discharged or fed therethrough to grids in said recesses in said carrier member, means supporting said paste feeding means above said carrier member with said surface thereof adjacent to said top surface of said carrier member, means for rotating said carrier member to cause said grid recesses in said carrier member to pass beneath said discharge opening in said paste feeding means, said surface of said paste feeding means extending from said opening sufficiently to overlie respective recesses in said grid carrier member during the intervals that said opening in said feeding means is in communication with any portion of said recesses whereby paste is prevented from overflowing said recesses during said intervals, and means for forcing paste through said discharge opening and into said grid receiving recesses of said carrier member during the intervals that said recesses are in communication with said opening in said feeding means.

6. In a machine for applying paste material to plate-like battery grids, a frame and carrier having an exterior surface provided with a plurality of spaced grid receiving recesses of a predetermined greater depth than the thickness of the grids to be pasted whereby the outer surface of the grids positioned in said recesses are predetermined distances below said surface of said grid carrier, means for rotatably supporting said grid carrier in said frame, paste feeding means comprising a member having a surface conforming in contour to said surface of said grid carrier and provided with a discharge opening in said surface, means supporting said member of said paste feeding means with its said surface adjacent to said surface of said grid carrier, means for rotating said grid carrier to cause said grid recesses therein to pass by said opening in said member of said paste feeding means, said surface of said member of said paste feeding means extending from said opening sufficiently to overlie respective recesses in said grid carrier during the intervals that said opening in said member of said feeding means is in communication with any portion of said recesses whereby paste is prevented from overflowing said recesses during said intervals, a hopper member provided with a plurality of paste receiving compartments, means slidably supporting said hopper member at the side of said member, means for intermittently moving said hopper member to selectively align the compartments thereof with said opening in said member, a plunger supported by said frame in alignment with said opening in said member and movable through a hopper compartment aligned therewith, and power means for intermittently advancing said plunger during intervals that said recesses are in communication with said opening in said member.

References Cited in the file of this patent

UNITED STATES PATENTS

| | | |
|---|---|---|
| 250,172 | Sewall | Nov. 29, 1881 |
| 1,487,774 | Willard | Mar. 25, 1924 |
| 1,547,523 | Richards | July 28, 1925 |